Feb. 3, 1948.  C. D. HAYWARD  2,435,433
LATCHING MECHANISMS FOR ELECTRIC SWITCHING DEVICES
Filed Sept. 7, 1946
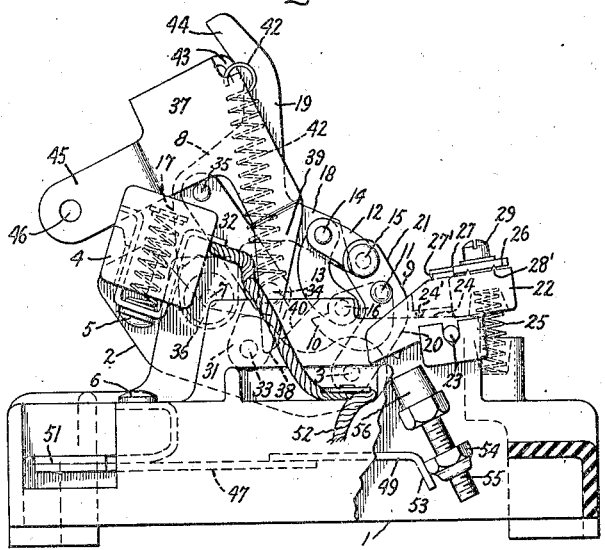
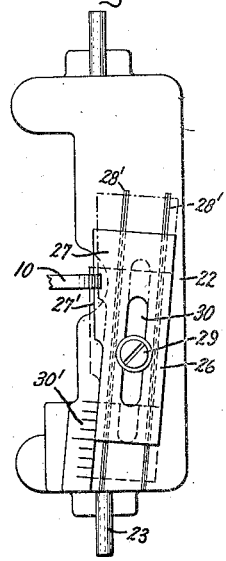
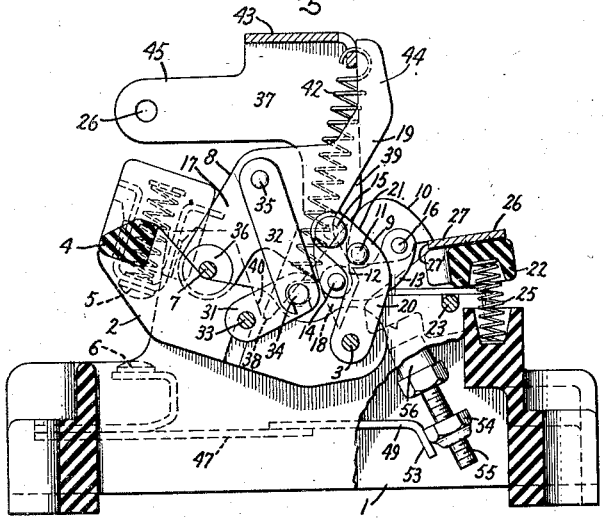
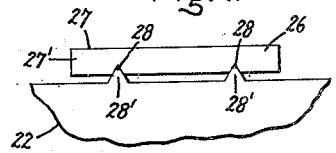
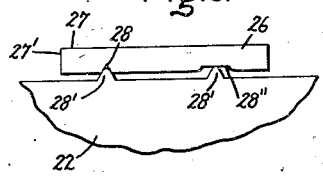
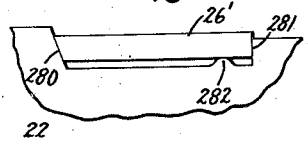
Inventor:
Claude D. Hayward,
by Ernest H. Britton
His Attorney.

Patented Feb. 3, 1948

2,435,433

UNITED STATES PATENT OFFICE 2,435,433

LATCHING MECHANISM FOR ELECTRIC SWITCHING DEVICES

Claude D. Hayward, Lansdowne, Pa., assignor to General Electric Company, a corporation of New York Application September 7, 1946, Serial No. 695,515

6 Claims. (Cl. 74—2)

My invention relates to improvements in latching mechanisms for electric switching devices, such as circuit breakers, relays and the like and more particularly to improvements in latching mechanisms which are readily adjustable, independently of testing means and the like, for varying the time required to cause tripping at any given current in the tripping range.

Latching mechanisms for electric switching devices usually have a time-current tripping characteristic which can be correctly adjusted at the factory where facilities for making a time-current response test are available. However, when such switching devices are installed and it becomes necessary to change the tripping time in the field where the necessary testing facilities are not available, it is important to have a suitably calibrated adjustment which can readily be made independently of such testing facilities. This supplementary adjustment is particularly desirable for the tripping devices of circuit breakers which operate with a time delay inversely proportional to the magnitude of the current so that, as circuit changes are required, the tripping of each circuit breaker, especially circuit breakers previously installed, can be properly coordinated with the tripping of the other circuit breakers on the circuit to provide maximum selectivity of action. For application to circuit breakers, relays and the like, such calibration features should be relatively simple and available at reasonable cost and should have minimum space requirements.

An object of my invention is to provide, in a latching arrangement for switching devices, an improved readily changeable and simple calibrating and latching means which can be adjusted in the field and elsewhere without any testing facilities whereby to vary the tripping time-current characteristic as desired. Another object of my invention is to provide an improved and relatively simple and compact calibrating and latching means whereby for any given current response setting, the tripping time can readily be varied independently of any testing means. These and other objects of my invention will hereinafter appear in more detail.

In accordance with my invention, I provide an arrangement for maintaining the latch of the latching mechanism of an electric switching device in the holding position, comprising a pivotally supported tripping member on which is mounted for movement relatively thereto only in a direction at a predetermined acute angle to the pivotal axis of the member, a latching element which has a latching edge substantially parallel to the pivotal axis of the member in the different relative positions of the member and the element. Further, in accordance with my invention, I provide means for securing the latching element on the tripping member in different predetermined relative positions according to a calibrated scale whereby to vary the tripping time for any given current setting which would tend to effect movement of the tripping member.

My invention will be better understood when considered in connection with the accompanying sheet of drawings and its scope will be pointed out in the appended claims.

In the accompanying sheet of drawings, Fig. 1 is an elevation partly in section of a circuit breaker provided with a latching and calibrating mechanism embodying my invention, the circuit breaker being shown in the circuit open position; Fig. 2 is an elevation similar to Fig. 1 except on a different sectional plane, the circuit breaker being shown in the reset position ready for closing; Fig. 3 is a plan view of the latching and calibrating mechanism shown in Figs. 1 and 2 with the parts positioned as shown in Fig. 2; Fig. 4 illustrates to an enlarged scale a detail of the modification of my invention shown in Figs. 1, 2 and 3; and Figs. 5 and 6 illustrate modifications of the detail shown in Fig. 4.

For the purpose of illustrating my invention, I have shown an embodiment thereof as applied to a two-pole automatic trip-free circuit breaker such as disclosed in the copending application of John A. Favre, Serial No. 671,185, filed May 21, 1946, and assigned to the same assignee as this invention. The parts of the circuit breaker are mounted on a suitable insulating base 1. These parts include a two-armed circuit controlling member 2 pivotally supported on a pin 3. For simultaneous movement, the two arms of the member 2 are rigidly connected by a transverse portion 4. At the ends of this portion are mounted resiliently supported contacts 5 which are arranged to engage cooperating stationary contacts 6 upon a predetermined counterclockwise movement of the circuit controlling member 2 from the reset position shown in Fig. 2 as will be apparent to those skilled in the art. Clockwise movement of the member 2 to the circuit open position, shown in Fig. 1 is limited by a pin 7 against which the two rigidly connected arms of the member abut as a stop.

For moving the circuit controlling member 2 to and maintaining it in the closed circuit position, there is provided a movable resetting element 8 pivotally supported on the pin 7. Cooperating with this element 8 is a collapsible mechanism which is operable to the rigid or thrust transmitting condition, shown in Fig. 2, upon clockwise movement of the element from the position shown in Fig. 1 to hold the resetting element in the reset position. This collapsible mechanism comprises a rocking lever 9 pivotally supported on the pin 3, a latch 10 pivotally connected to the lever 9 at an intermediate point 11 thereof, two links 12 and 13 pivotally connected to the resetting element 8 at 14 and respectively to the rocking lever 9 and to the latch at 15 and 16. As shown, the resetting element 8 comprises three rigidly connected arms 17, 18 and 19, the arms 18 and 19 each comprising two portions suitably inclined to each other. Also the rocking lever 9 comprises in effect two arms 20 and 21 suitably inclined to each other.

For holding the collapsible mechanism in the rigid condition, I provide in accordance with my invention a releasable abutment which as shown takes the form of a transverse member or tripping bar 22 which may be of suitable insulating material. This bar is pivoted on a pin 23 mounted in the base 1 and is biased for counter-clockwise movement to the holding position so that a projection 24' on the tripping bar 22 abuts a shoulder 24 on the base, as shown in Fig. 1. As shown in Fig. 1, the biasing means is a relatively light spring 25. For direct engagement with the latch 10, the tripping bar 22 is provided with a latching element such as a bearing plate 26 having a suitably hardened bearing surface 27 and a straight latching edge 27'. Further, in accordance with my invention the latching element 26 is mounted on the tripping member 22 for movement relatively thereon only in a direction at a predetermined acute angle to the pivotal axis 23 of the member, so as to maintain the latching edge 27' at the same acute angle to such pivotal axis in different predetermined relative positions of the member and the element whereby to vary the overlap of the latch 10 relatively to the plate 26. For this purpose, the plate 26 and the member 22 are provided with cooperating guiding means such as one or more parallel grooves 28 in the plate which register with one or more registering ribs 28' on the member 22. The angle between the ribs 28' and the pivotal axis 23 of the tripping bar 22 is relatively small and is the same as the angle between the latching edge 27' and the grooves 28 in the plate 26 so that in the different relative positions of the bar and the plate the latching edge takes up successive parallel positions. However, in so doing the amount of overlap of the latch 10 on the plate 26 is varied and thus the angular movement of the tripping bar 22 necessary to cause the release of the latch 10 is changed. For securing the plate 26 on the bar 22 in the different predetermined relative positions, I provide suitable means such as a holding screw 29 which projects through a longitudinal slot 30 in the plate into the tripping bar 22. Because of the relatively small angle between the pivotal axis 23 of the tripping bar 22 and the cooperating guiding means 28 and 28', a micrometric adjustment of the overlap of the latch 10 on the plate 26 is possible. This in conjunction with a suitably calibrated scale 30' makes it possible to vary the tripping time of the circuit breaker for any given current setting in dependence on the magnitude of the latch overlap without testing facilities as will hereinafter appear.

Assuming that:

$\theta$ is the angle between the pivotal axis 23 and the guide ribs 28'; also the angle between the latching edge 27' and the guide slots 28, $e_0$ is the initial latch enlargement or overlap of the latch 10 on the bearing surface 27 and $d$ is the distance the plate 26 is moved longitudinally for a latch engagement or overlap $e$, then $e = e_0 + d \sin \theta$.

Instead of two similar guiding ridges 28' and two corresponding similar grooves 28 as shown in Figs. 1 to 4, I may use two guiding ridges 28' and one V-shaped groove 28 together with a flat bottomed bearing groove 28'' as shown in Fig. 5. Also the tripping member 22 may, as shown in Fig. 6, be provided with a generally trapezoidal-shaped groove having one face 280 at such an angle as to bind the latching plate 26' against the opposite face 281 and a bearing ridge 282. In this case the faces of the plate which register with the faces 280 and 281 will have the same angular relation as these faces in the bar 22. Longitudinally, of course, the faces 280 and 281 are inclined at the same angle to the pivotal axis of the bar.

For actuating the circuit controlling member 2 to the closed-circuit position after the collapsible mechanism is set and latched, as shown in Fig. 2, there is provided an over-center operating mechanism for effecting a snap action in both the opening and closing movements of the member. This mechanism comprises a toggle 31—32 interconnecting the circuit controlling member 2 and the resetting element 8. The toggle link 31 is pivotally connected to the member 2 at 33 and to the toggle link 32 at 34. The link 32 is pivotally connected to the resetting element 8 at 35. In the circuit closed position of the circuit controlling member 2, the toggle 31—32 is overset against a stop 36 mounted on the pin 7. For actuating the toggle 31—32 over center to the holding position when the collapsible mechanism is latched in the rigid position shown in Fig. 2, there is provided an operating member 37 which is mounted for movement about a stationary axis 38. This operating member is U-shaped and has two parallel spaced legs 39, the tapered ends of which set in V-shaped pockets 40 in the base 1. In the circuit closed position of the circuit breaker, the legs 39 come to rest against the left-hand edge of the notches formed in the pockets 40. The desired over-center snap action is obtained by springs 42 connected between the knee pin 34 of the toggle and a suitable point on the operating member 37 such as the transverse portion 43 thereof. For obtaining the resetting action and the opening and closing of the circuit breaker by operation of the operating member 37 alone, the arm 19 of the resetting element 8 has an angularly displaced portion 44 which abuts the transverse portion 43 of the operating member when the circuit breaker is in the open position shown in Fig. 1 and also when in the reset position shown in Fig. 2, so that a circuit breaker mounted in a transformer tank, for example, can be operated from outside the tank, each leg 39 of the operating member is provided with a wing extension 45 to which an operating rod or the like can readily be connected as by a pin passing through openings 46 in the wing extension.

For actuating the tripping bar 22 to effect an automatic opening of the circuit breaker, thermal electro-responsive means are provided for each pole. This means comprises two parallel spaced bars 47, only one of which appears edgewise in Figs. 1 and 2 of suitable bimetallic material conductively joined at their free ends by an operating bar 49 of suitable material but not bimetallic. The bars 47 are firmly secured to the base 1 by suitable means not shown and the stationary contact 6 is in conductive relation with one of the bars of a pair while the fixed end of the other bar of the same pair is provided with a terminal 51. The path of current flow through a pole of the circuit is thus from terminal 51, through one bar 47 of a pair across through the operating bar 49 to the other bar 47 of the pair, thence to the associated stationary contact 6, the cooperating movable contact 5 and out through a flexible lead 52 which is conductively connected to the contact 5. The operating bar 49 has a downward extension 53 to which is secured a suitable type of lock-nut 54 in which is adjustably positioned a screw 55. Rigidly secured to the upper end of this screw is a projection so positioned below the tripping bar 22 that upon sufficient heating of the bimetallic thermal pins 47, the projection engages the tripping bar and moves the plate 26 from the latch 10 whereby to effect the opening of the circuit breaker. Thus, by varying the position of the projection 56 relatively to the operating bar 49, the current trip setting or response can be changed. This requires, of course, suitable testing facilities to determine when the desired setting is effected. When the current setting is established, then the time setting can be varied by changing the position of the latching element 26 relatively to the tripping member 22 on the basis of the calibrated scale 30'. Since this adjustment of the overlap of the latch 10 on the latching plate 26 is of a micrometric character and can be accomplished independently of testing facilities, it provides a simple and ready means for adjustment in the field and moreover a means which is particularly advantageous in connection with thermally responsive tripping means.

While I have shown and described my invention in considerable detail, I do not desire to be limited to the exact arrangements shown and described, but seek to cover in the appended claims all those modifications that fall within the true spirit and scope of my invention.

What I claim as new and desire to secure by Letters Patent of the United States is:

1. In a latching mechanism for electric switching devices, a pivotally supported tripping member, a latching element mounted on said member for movement relatively thereon only in a direction at a predetermined angle to the pivotal axis of the member, said element having a latching edge substantially parallel to the pivotal axis of the member while in different positions thereon, and means for securing said element on said member against relative movement in said different positions.

2. In a latching mechanism for electric switching devices, a pivotally supported tripping member, a latching element movably supported on said member, guiding means for maintaining the movement of said element on said member in a direction at a predetermined acute angle to the axis of the member, said element having a latching edge forming substantially the same predetermined acute angle with the direction of the guiding means, and means for securing said element and said member against relative movement in different predetermined relative positions.

3. In a latching mechanism for electric switching devices, a pivotally supported tripping member, a latching element mounted on said member for movement longitudinally thereof, said latching member having a latching edge, cooperating guiding means on said member and said element for effecting lateral displacement of said latching edge in successive parallel positions upon longitudinal movement of the element relatively to the member, and means for securing said member and said element against relative movement in different predetermined relative positions.

4. In a latching mechanism for electric switching devices, a pivotally supported tripping member, a latching element mounted on said member for longitudinal movement relatively thereto, cooperating guiding means on said member and said element arranged to permit longitudinal movement of the element relatively to the member only in a direction at a predetermined acute angle to the pivotal axis of the member, said element having a latching edge substantially parallel to the pivotal axis of the member, and means for securing said element and said member against relative movement in different predetermined relative positions.

5. An arrangement for maintaining the latch of the latching mechanism of an electric switching device in the holding position comprising a pivotally supported tripping member having a guiding ridge extending generally lengthwise of the member at a predetermined acute angle to the pivotal axis of the member, a latching element having a longitudinally extending groove adapted for sliding engagement with the ridge on said member and a latching edge substantially parallel to the pivotal axis of the member when on the member with the ridge thereof in the groove of the element, the pivotal axis of said member being so positioned that the latching edge of said element lies in the path of movement of the device latch, means for securing said element and said member in different predetermined relative positions to vary the overlap of the latch on said latching element, means biasing said member for movement in a direction to move the latching edge of said element into the path of movement of the device latch, and means for limiting the movement of said member in said direction.

6. An arrangement for maintaining the latch of the latching mechanism of an electric device in the holding position comprising a pivotally supported tripping member, a latching element mounted on said member for movement longitudinally thereof to different predetermined relative positions, said latching element having a straight latching edge, cooperating guiding means on said member and said element extending longitudinally thereof at a predetermined acute angle to the axis of the member for maintaining said latching edge substantially parallel to the pivotal axis of the member in the different relative positions of the member and the element, the pivotal axis of the member being so positioned that the latching edge of the element lies in the path of movement of the device latch, means for securing said element and said member in said different predetermined relative positions to vary the overlap of the latch on said latching element, means biasing said member for movement in a direction to move the latching edge of said element into the path of movement of the device latch, and means for limiting the movement of said member in said direction.

CLAUDE D. HAYWARD.